United States Patent [19]

Breyer et al.

[11] Patent Number: 5,134,782
[45] Date of Patent: Aug. 4, 1992

[54] COORDINATE-MEASURING MACHINE

[75] Inventors: Karl-Hermann Breyer, Heidenheim; Werner Leitenberger, Heidenheim-Mergelstetten; Rainer Ohnheiser, Lauterstein; Klaus Herzog, Oberkochen, all of Fed. Rep. of Germany

[73] Assignee: Carl-Zeiss-Stiftung, Heidenheim/Brenz, Oberkochen, Fed. Rep. of Germany

[21] Appl. No.: 651,143

[22] Filed: Feb. 6, 1991

[30] Foreign Application Priority Data

Feb. 20, 1990 [DE] Fed. Rep. of Germany ....... 4005292

[51] Int. Cl.$^5$ .............................................. G01B 5/03
[52] U.S. Cl. ........................................ 33/503; 33/1 M
[58] Field of Search ............ 33/503, 504, 1 N, 1 PT, 33/1 MP, 1 M

[56] References Cited

U.S. PATENT DOCUMENTS

| 3,561,125 | 2/1971 | Zeidler | 33/503 |
| 4,276,698 | 7/1981 | Dore et al. | 33/503 |
| 4,621,926 | 11/1986 | Merry et al. | 33/503 |
| 4,800,652 | 1/1989 | Ballas et al. | 33/504 |
| 4,825,555 | 5/1989 | Murayama et al. | 33/503 |
| 4,958,438 | 9/1990 | Hemmelgarn | 33/503 |
| 4,961,267 | 10/1990 | Herzog | 33/503 |
| 5,035,503 | 7/1991 | Sadeh et al. | 33/503 |

FOREIGN PATENT DOCUMENTS

| 8700081 | 8/1988 | Netherlands | 33/1 MP |
| 2189604 | 10/1987 | United Kingdom | 33/503 |

Primary Examiner—Thomas B. Will
Attorney, Agent, or Firm—Hopgood, Calimafde, Kalil, Blaustein & Judlowe

[57] ABSTRACT

A coordinate-measuring machine has a vertical column which is linearly guided in one horizontal direction (x) and on which a measurement arm is guided for vertical displaceability. The linear movement (x) is produced by a carriage in which the column is mounted for rotational displacement about a vertical axis. A workpiece to be measured is mounted to a turntable. The construction provides a coordinate measuring machine having four axes, two linear and two rotational, and the machine is structurally compact in terms of the measurement volume which is achievable.

11 Claims, 7 Drawing Sheets

COORDINATE-MEASURING MACHINE

BACKGROUND OF THE INVENTION

There are a large number of different embodiments of multicoordinate-measuring machines. A survey of the different forms is given in an article by M. Dietsch and H. Lang, published in "Feinwerktechnik und Messtechnik 86" (1978), pages 262 to 269. All the machines described therein are basically of the same construction: the machines consist of three guides which are arranged at right angles to each other and built on top of each other; a probe head is displaceable linearly along each of these guides, and one of three measurement scales is associated with each of the guides.

Coordinate-measuring machines are also known which do not measure in a Cartesian coordinate system but rather in spherical or cylindrical coordinates. Thus, for example, British Patent 1,498,009 describes a coordinate-measuring machine in which the probe head is movably mounted by means of three articulations arranged one behind the other. The position of the probe head in this machine is determined by angle measurements at the respective articulations. A coordinate-measuring machine of similar construction is known from U.S. Pat. No. 4,240,205, wherein the probe head is mounted on a vertically displaceable spindle which, in turn, is guided in a single plane via three articulations which involve vertically oriented axes of rotation. The position of the spindle in the plane is measured by means of a scale and a rotary-angle transmitter.

It is difficult to effect high-precision measurements with these machines since the individual parts of the articulation arm are subjected during a measurement to varying conditions of load, due to the active length of the articulation arm, which depends on the position of the probe head; these mechanisms therefore deform, and the deformation in one axis depends on the positions of the parts of the articulation arm in the other axes.

EP-A-0,342,267 discloses a coordinate-measuring machine in the form of a column which carries a probe head which is vertically displaceable and is movably guided by hand in a plane and can also be rotated around its longitudinal axis. However, it is not readily possible to equip this known machine with drives. In a motorized version which is also described in EP-A-0,342,267, the column is displaceable pursuant to operation of two linearly acting drives in the horizontal coordinates (x) and (y), and the workpiece to be measured is mounted to a rotary table. This machine, however, is not of compact construction, and it is difficult to avoid bending moments in the transmission of y-axis drive forces, which act far outside the center of gravity of the column, to the displaceable column.

BRIEF STATEMENT OF THE INVENTION

The object of the present invention is to provide a coordinate-measuring machine which is of the simplest possible but stable construction and permits precise measurements.

The invention achieves this object in a coordinate-measuring machine in which a column is displaceable linearly in one direction, in which a measurement arm (with probe head) is keyed to and guided on the column for vertical displacement, and in which the column is mounted for rotation about a vertical axis (A); the linear displaceability results from mounting the column to a linearly guided carriage and measurement systems for introducing and/or detecting rotational displacement of the column.

The coordinate-measuring machine of the invention has only two linear axes, and the third linear axis, which is otherwise customary, is replaced by a pivot bearing. Highly accurate pivot bearings can be produced at considerably less expense than linear guides in the lengths customary for coordinate-measuring machines while satisfying the demands as to precision in guidance. Varying moments do not occur during a measurement, since the measurement arm of the machine is rigid and its length is constant.

The entire coordinate-measuring machine can be very compact, since the column which carries the measurement arm is linearly displaceable in only one horizontal coordinate direction, and since displacement of the probe head in the second horizontal coordinate direction is via rotary movement of the column. Furthermore, since work-contacting measurements in the second horizontal direction involve essentially only rotary displacement of the measurement arm and its probe head, these are essentially the only factors affecting moment-of-inertia considerations; thus, relatively high acceleration can be obtained for work-contacting displacements, and measurements can be effected rapidly.

It is preferable for the coordinate-measuring machine to have a turntable for rotatably mounting a workpiece to be measured, with turntable rotation about a second vertical axis. In this case, the vertical plane which contains the two axes of rotation—that of the column and that of the turntable—is substantially parallel to the linear direction of carriage displaceability, whereby the column is displaceable toward or away from the turntable and its workpiece. By these measures, even very large workpieces can be optimally measured without reloading. Moreover, the second rotary axis, which is provided by the turntable, makes it much easier to obtain measurements with probe-head displacements perpendicular to the direction of carriage guidance, since such measurement displacements can be the resultant of concurrent use of the two rotary displacements, namely, that of the column and that of the workpiece on the turntable. For this purpose, the coordinate-measuring machine advantageously has a control module which is so programmed that it coordinates the two rotary displacements in the desired manner.

The vertical column can be totally mounted to the linearly guided carriage, in which case antifriction bearings can separately provide the stabilizing functions of upper radial location at an elevation vertically spaced above a combined radial/thrust bearing for both axial support and lower radial location.

However, it is particularly advantageous if the rotatable column is mounted for radial location in the carriage and if axial support and location are derived from a stationary part of the machine table which carries the guide for the carriage. Such an arrangement results in a particularly stable construction, since freedom for column rotation about its vertical axis is then independent of the vertical-support function which is borne directly by the stationary machine table; Specifically, the axial bearing is a surface bearing, and vertical stability against tilting of the rotary axis of the column is achieved by widely spaced air bearings reacting against the smooth flat horizontal plane of the machine table.

DETAILED DESCRIPTION

Several embodiments of the invention will be described in detail, in conjunction with the accompanying drawings, in which.

Figure 1:
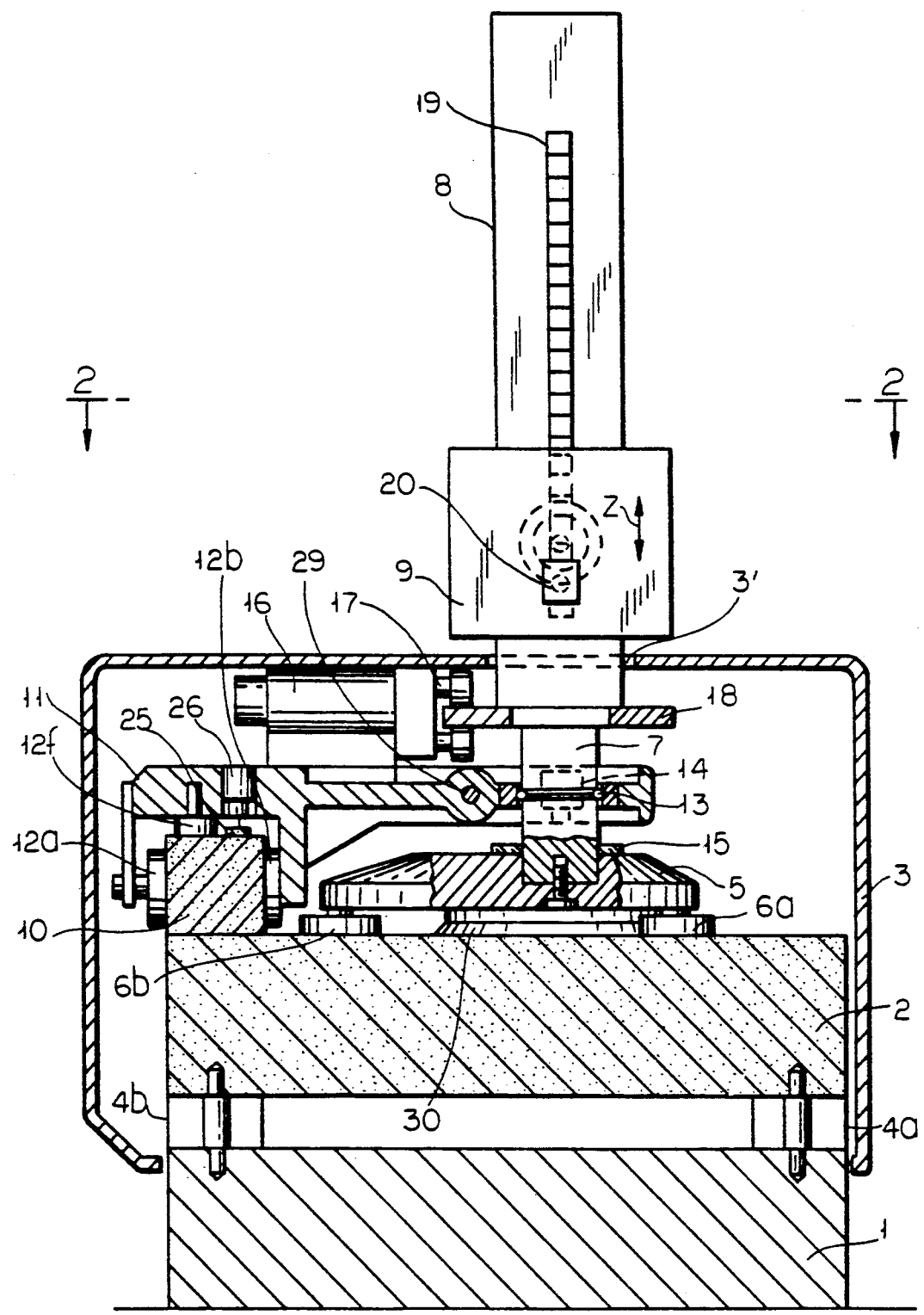
FIG. 1 is a view in end elevation of a first coordinate-measuring machine of the invention, the view being partly broken-away and in vertical section to show detail of supporting and actuating mechanical relationships.
Figure 2:
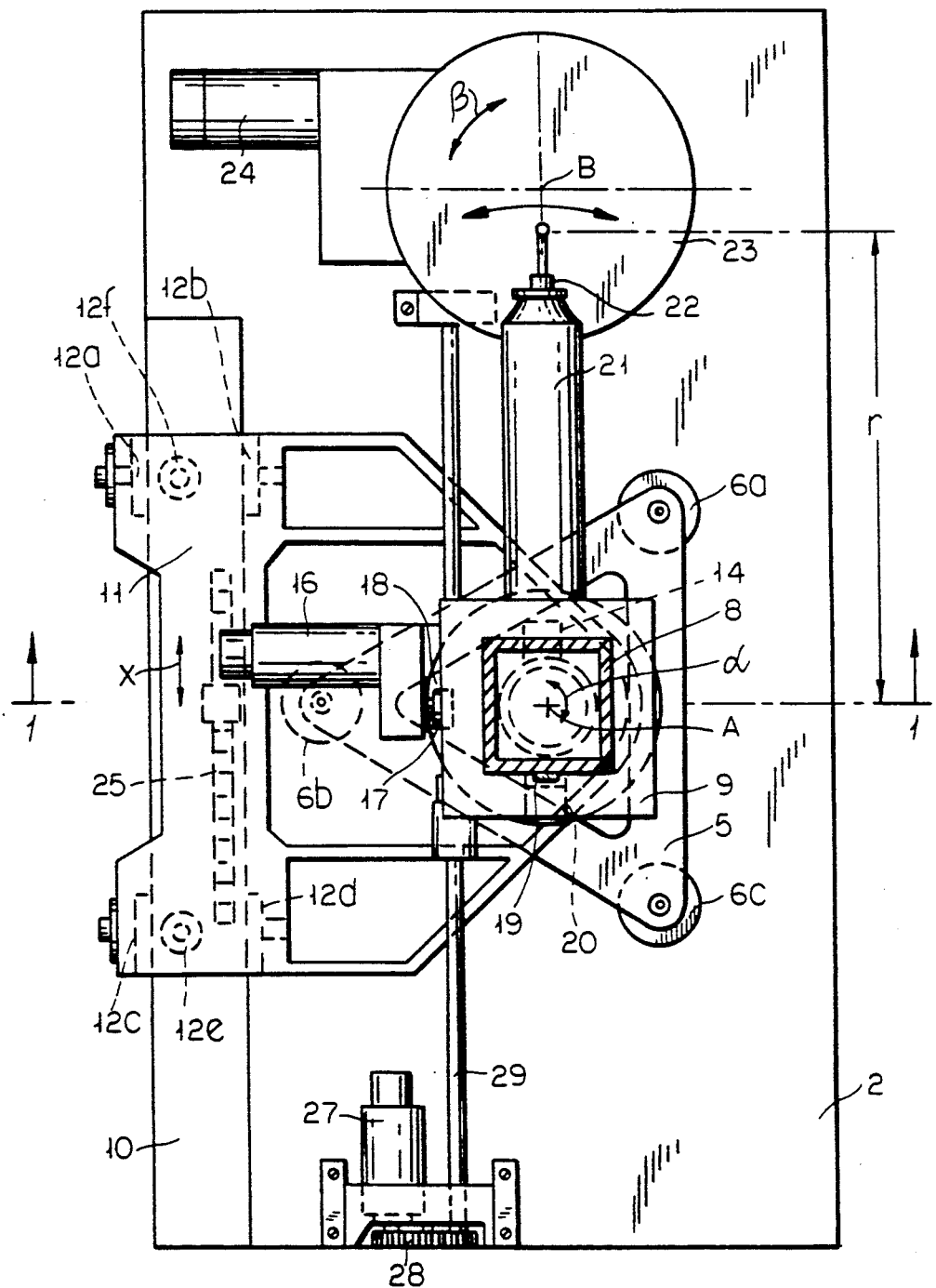
FIG. 2 is a plan view of the machine of FIG. 1, with cover plate removed, showing at I—I the vertical-section plane of FIG. 1, and a portion of FIG. 2 being in section at the plane II—II of FIG. 1.

The coordinate-measuring machine of FIGS. 1 and 2 has a machine table 2 which rests via four vibration dampers 4 on the foundation 1 of the machine; only two (4a, 4b) of these vibration dampers are visible in FIG. 1.

Table 2 provides a flat horizontal surface for three spaced air bearings 6a, b, c, at the base 5 of an upstanding column 8. Column 8 is linearly displaceable along this table surface and is also rotatable about its vertical axis A, as will be more fully described.

A carriage 11 is guided for linear horizontal displacement in the direction of double-headed arrow X in FIG. 2, relying on six air bearings 12a-f which react with three exposed elongate surfaces of a guide ledge 10 that is secured to a side of table 2. Carriage 11 is driven by a motor 27 and by a transmission 28 to a smooth elongate shaft 29, which extends through carriage 11; rotation of shaft 29 can be translated into longitudinal displacement of carriage 11, illustratively by a so-called roll-ring transmission on the carriage. Roll-ring transmissions are known per se and therefore detail of this transmission on carriage 11 is not shown. Longitudinal displacement of carriage 11 is tracked by a photoelectric sensor 26 which scans a scale 25 secured to the guide ledge 10.

Within carriage 11, a reduced cylindrical lower end portion 7 of column 8 provides connection to the column base 5, and portion 7 is inserted in and mounted to the inner ring of a radial bearing 13, the outer ring of which is mounted to carriage 11. The radial bearing 13 makes it possible to rotate column 8 about its axis A and with respect to the carriage 11, as indicated by double-headed arrow a in FIG. 2. The base 5 is a fixed part of column 8; therefore, base 5 axially supports column 8 via the air bearings 6a-c, in reaction with the surface of table 2 while also freely accommodating column rotation about axis A. In this connection, the relatively large base spacings between air bearings 6a-c will be seen to prevent wobbling or tilting of column 8, whether in the course of rotary displacement of column 8 or in the course of linear displacement of the carriage 11.

To provide rotary displacement of column 8, the carriage 11 carries a motor 16 which drives a friction-wheel transmission 17, engaged to a disk 18 that is attached to column 8. The angular extent $\alpha$ of the rotary displacement is tracked by a photoelectric sensor 14 mounted to carriage 11 and positioned to scan a graduated circular scale 15 secured to base 5 of column 8.

Drives and measurement systems in the lower region of column 8 are protected by a cover 3, having an elongate slot 3' in its upper part, and extending in the X-direction of guidance. A cylindrical portion of column 8 extends through slot 3', and in the region above cover 3, column 8 is rectangular, being shown to be of square section and providing rotationally keyed and vertically displaceable guidance of a carriage 9, in the direction of the double-headed arrow Z of FIG. 1.

Figure 7:
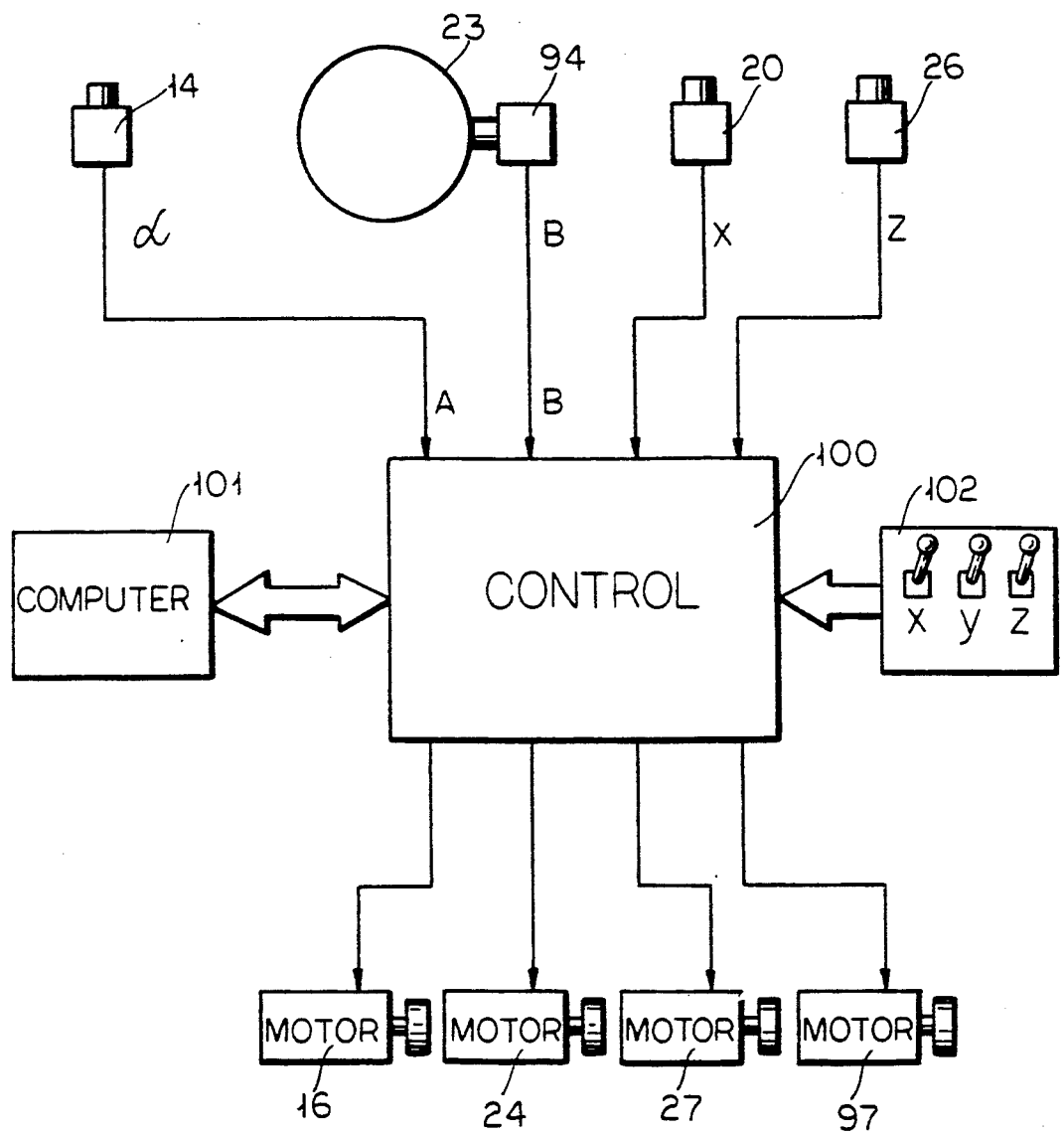
FIG. 7 is a simplified block diagram of the control system used for the coordinate-measuring machine of FIGS. 1 and 2.

Carriage 9 mounts the measurement arm 21 of the coordinate-measuring machine, and a probe head 22 is shown attached to the front end of arm 21. Linear Z-direction movement of carriage 9 is measured by a photoelectric sensor 20 which tracks a scale 19 secured to column 8. For simplicity, the drive 97 for Z-direction displacement of carriage 9 is not shown in FIGS. 1 and 2, but it is schematically indicated in FIG. 7 and will be understood to be carried within column 8.

At the table (2) end which faces the probe head 22, a turntable 23 is mounted for rotation about a vertical axis B, pursuant to motor drive by means 24. The axis A of column-8 rotation and the axis B of turntable-23 rotation have a longitudinally spaced parallel relation, defining a vertical plane which is preferably parallel and at least substantially parallel to the X-direction of carriage (11) guidance. Turntable 23 will be understood to be adapted for mounting reception of a workpiece to be measured, and workpiece rotation will be understood to be measured in terms of angular displacement $\beta$, sensed by photoelectric means 94 tracking a circumferential scale associated with turntable 23, as schematically indicated in FIG. 7.

In the process of measuring a workpiece, the probe head 22 is moved by means of the carriages 11 and 9 in the two orthogonal coordinate directions X and Z, pursuant to the control of their respective drive means 16 and 97. The conventional third-coordinate direction is omitted, being replaced by sluing displacement $\alpha$ of column 8 about axis A. In this connection, the probe head is subjected to an arcuate displacement which is of greater or lesser extent depending upon the effective length r of the measurement arm. This arcuate displacement is, however, entirely sufficient for purposes of workpiece-measuring contact, as long as the effective length of the measurement arm is long enough to reach all points to be measured on the workpiece, when it is considered that turntable 23 can be rotated about axis B to position all workpiece-measurement points within reach of probe head 22. This displacement of the measurement arm 21 by the necessary angular amounts proceeds extremely rapidly, due to the involved relatively small moments of inertia.

Control of linear and angular displacements in the coordinate-measuring machine of FIGS. 1 and 2 is effected by a special control module 100 (see FIG. 7) having connections to the computer 101 of the coordinate-measuring machine as well as to an operating panel 102. By means of panel 102, the user determines the desired movements, as is customary in three orthogonal linear-displacement directions x, y and z. Also connected to the control module 100 are the respective transmitted outputs of the photoelectric sensors 20 and 26 by which the linear movement X of the carriage 11 and the linear movement Z of the carriage 9 are measured, as well as the transmitted outputs of photoelectric angle sensor 14 (for the angle $\alpha$ of column-8 rotation) and of the sensor 94 (for the angle $\beta$ of turntable-23 rotation). The control module 100 is additionally connected to drive motor 16 for rotation of the column 8, to motor 24 for turntable-23 rotation, to motor 27 for X-displacement of carriage 11, as well as to motor 97 (not shown in FIGS. 1 and 2) for Z-displacement of carriage 9. By suitable programming of the control module, the result can be obtained that a displacement in the linear coordinate y, which is not directly realized, is brought about by a mathematically resolving superpositioning of the angular-displacement values $\alpha$ and $\beta$ of the column and turntable, together with the linear displacement value X of carriage 11. This makes it possible for the user to more easily control the machine, as for example during the customary manually operated phases of a user-learning program, wherein the user has had prior experience with machine operations in terms of the three orthogonal axes x, y and z.

Figure 3:
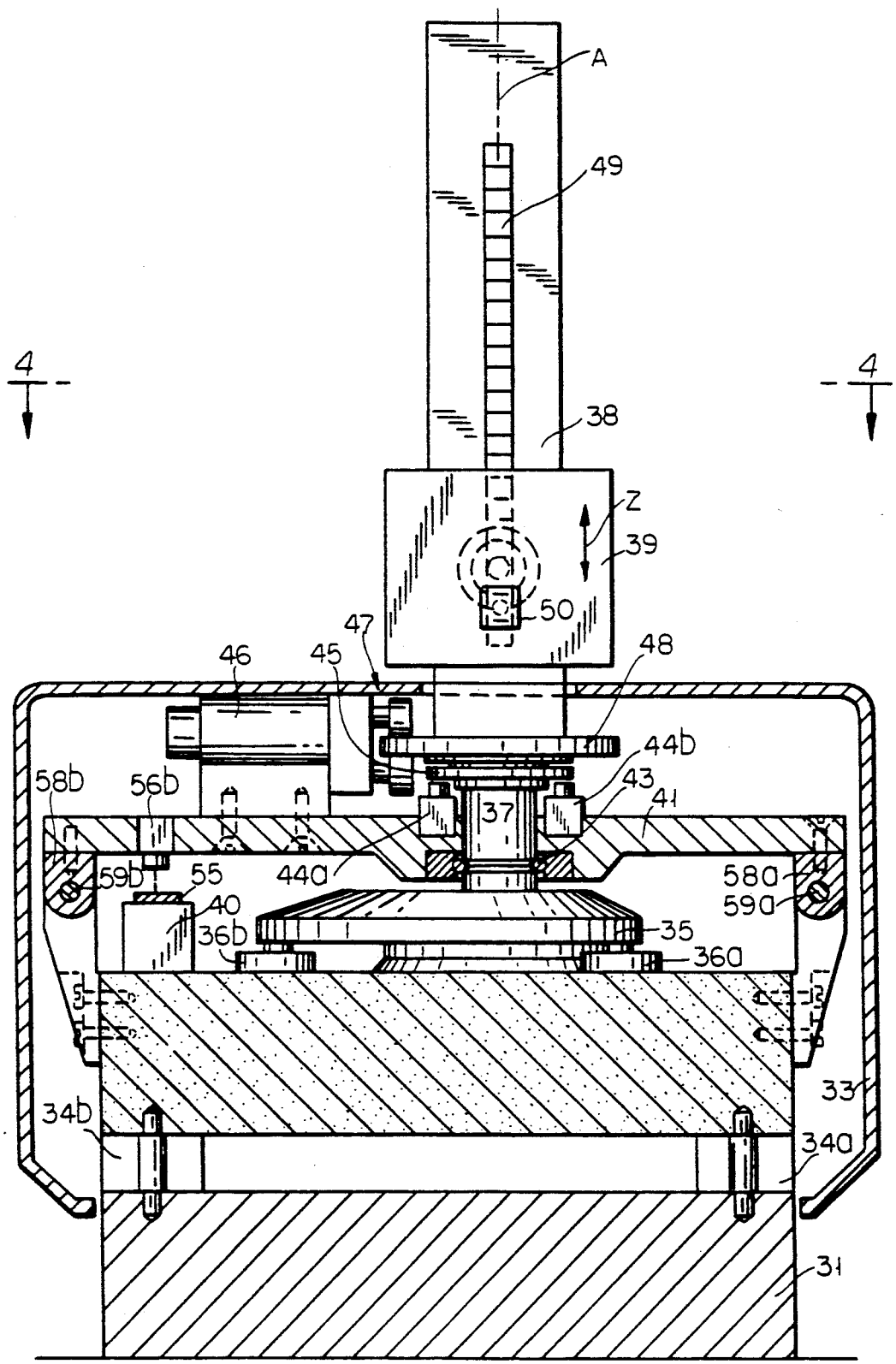
FIG. 3 is a view similar to FIG. 1, for a second embodiment of the invention.
Figure 4:
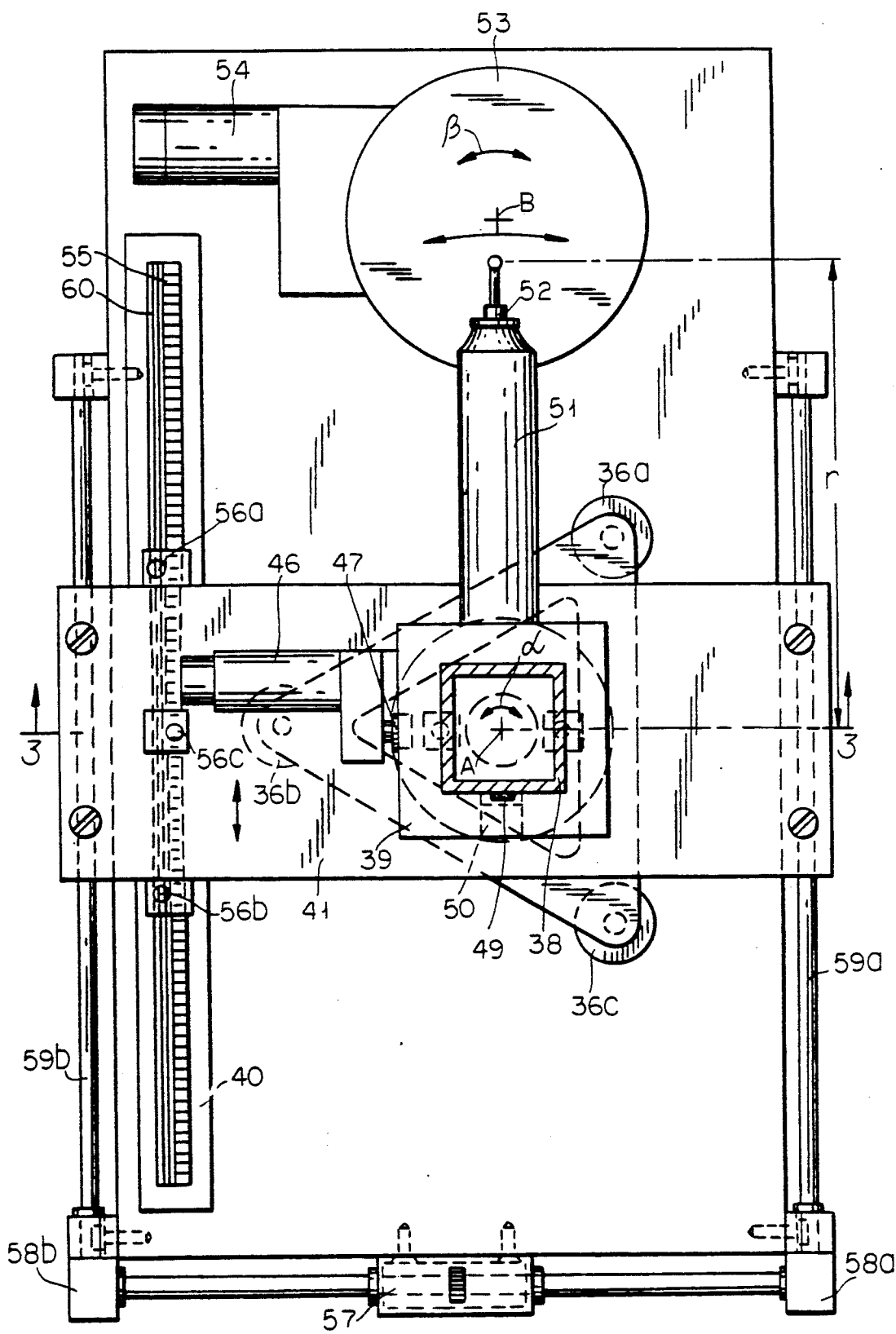
FIG. 4 is a view similar to FIG. 2, for the embodiment of FIG. 3, showing at III—III the vertical-section plane of FIG. 3, and a portion of FIG. 4 being in section at the plane IV—IV of FIG. 3.

The coordinate-measuring machine of FIGS. 3 and 4 is only slightly modified, as compared with that of FIGS. 1 and 2. Identical parts having the same function have been provided with reference numbers which have been incremented by 30 and therefore need not be further explained. One difference from the embodiment of FIGS. 1 and 2 is that the carriage, which is horizontally displaceable in the X-direction and which is designated 41 in FIGS. 3 and 4, is driven by two linear drive units 58a and 58b which are coupled via a shaft to a common drive motor 57. Such linear-drive systems are known per se, as for example the product known Neff-Wiesel WO3-ZRT, available from Neff Gewindespindeln GmbH, Waldenbuch, Federal Republic of Germany; such a linear-drive system relies upon an endless toothed belt (not shown) within each of two spaced guides 59a, 59b, both belts being driven by motor 57, and with a pick-off connection from each belt to carriage, via an elongate slot (not shown) in the involved guide.

The relatively light carriage 41 is moved by these linear drive units.

The construction of FIGS. 3 and 4 permits of a possible incremental lateral component of carriage-41 displacement, perpendicular to the X-direction, as well as a possible increment of rotation about the vertical. Therefore, without special additional measures, the position of the probe head 52 on the measurement arm 51 of the coordinate-measuring machine cannot be reliably determined. Such an additional measure is achieved by providing, adjacent the longitudinal measurement scale 55 (which is at lateral offset on the one side of the column 38 that is displaced by carriage 41), a correction track comprising additional rulings 60 in the form of parallel longitudinal lines, i.e., in the X-direction of carriage guidance This correction track is scanned by two longitudinally spaced photoelectric sensors 56a and 56b. Such errors in position of the probe head 52 as are attributable to incremental rotation of carriage 41 about the vertical can be determined by taking the difference between the measurement values sensed by the two sensors 56a and 56b and can be used in known manner for correction of the position of the probe head 52, in that the measured difference is multiplied by the ratio which the longitudinal distance r (between rotary axis A and the work-contact point of the probe head 52) bears to the longitudinal distance between the two sensors 56a and 56b. Bodily lateral incremental displacement of the carriage 41 (i.e., perpendicular to the X-direction of guidance is detected by taking the average value of the transmitted output signals of the two sensors 56a, 56b. A third photoelectric sensor 56c scans the longitudinal-displacement scale track 55 and supplies the output signal which indicates position in the direction X.

The coordinate-measuring machine of FIGS. 3 and 4 is further shown to include two photoelectric transmitters 44a and 44b, for dual scanning of a graduated circle at 45, whereby to measure rotary displacement of column 38 about axis A. This dual scanning serves, in the same way as the described measurement of incremental lateral displacement and rotation of the carriage 41, to increase the precision of machine measurement.

Control of the machine of FIGS. 3 and 4 is effected essentially in the same way as described for FIGS. 1 and 2, in connection with FIG. 7, except that, in FIGS. 3 and 4, the measurement values of the correction systems are also detected and used in calculating the work-contact position of the probe that is mounted to probe head 52. In addition, it will be understood that systematic deviations of the measurement values are determined in a prior calibration process and are stored in the machine's computer, as correction values for use in computer calculation of the true position of the probe element.

As in FIGS. 1 and 2, the vertical column 38 of the machine of FIGS. 3 and 4 is located for rotary displacement solely by a simple radial bearing 43 in carriage 41, and column 38 is axially supported, via three air bearings 36a–c in the base 35 of column 38, directly on the flat upper surface of table 32. On the other hand, in the third embodiment shown in FIGS. 5 and 6, a different solution is shown for support of the vertical column 68.

Figure 5:
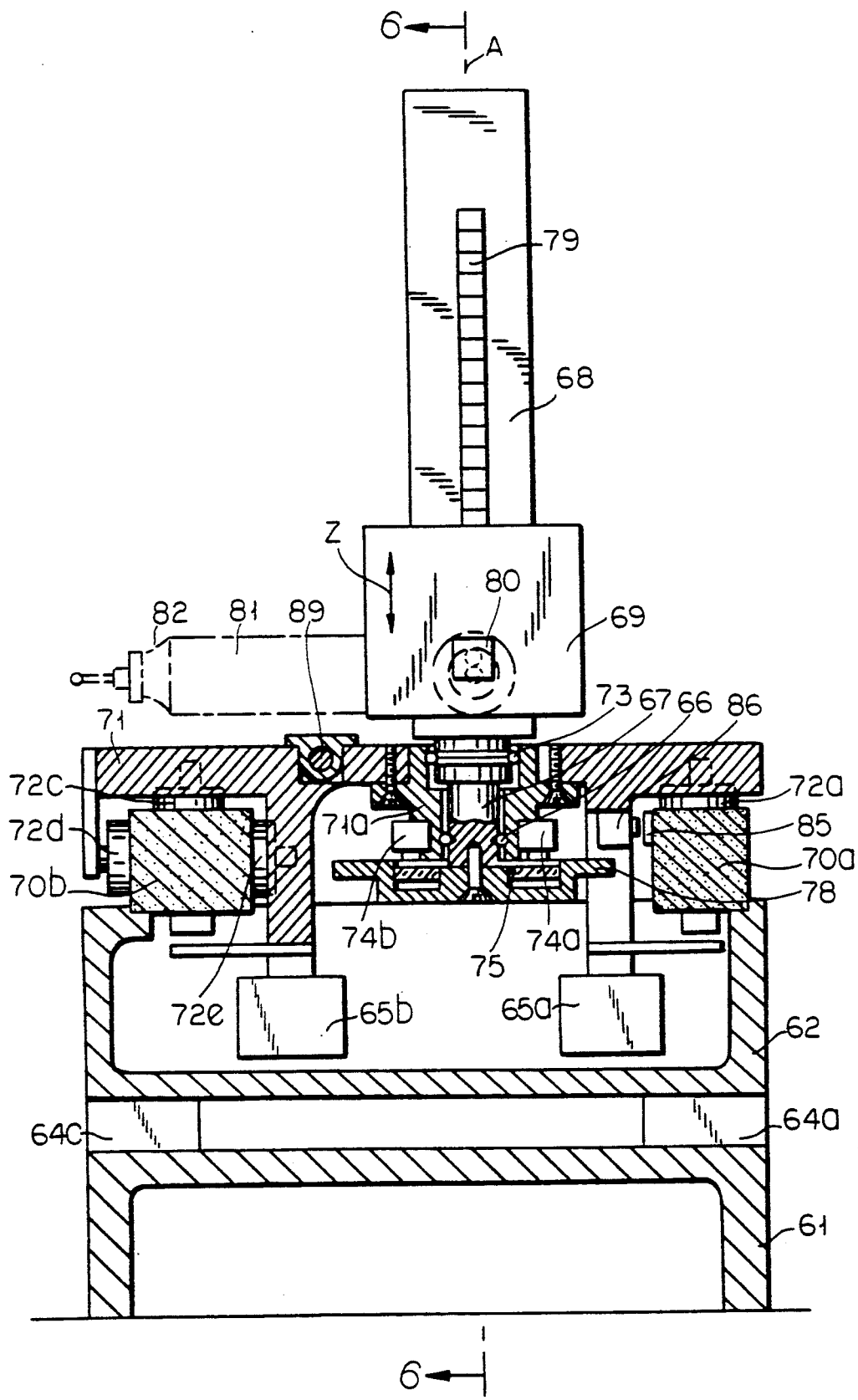
FIG. 5 is a view similar to FIGS. 1 and 3, for a third embodiment of the invention.
Figure 6:
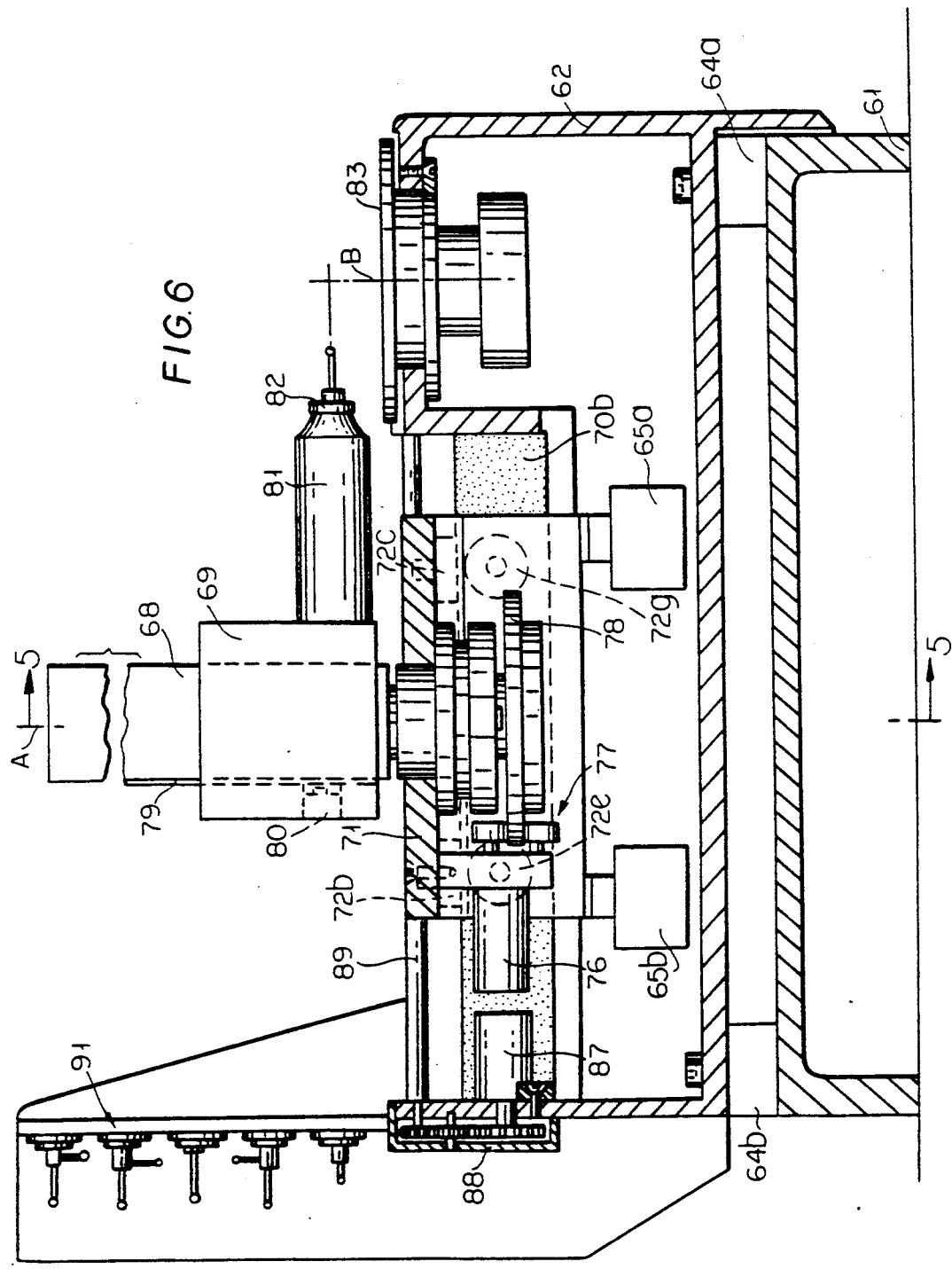
FIG. 6 is a view in side elevation of the embodiment of FIG. 5, taken partly in vertical section in the plane VI—VI of FIG. 5, and showing at V-V the vertical-section plane of FIG. 5.

The coordinate-measuring machine of FIGS. 5 and 6 does not have a flat-surface machine table. Instead, an upwardly open support part 62 of U-shaped section is mounted on the four vibration dampers 64a–d, and two parallel guide ledges 70a and 70b are fixed to the respective upper ends of the side walls of the U-shaped section. A carriage 71 spans both of these guide ledges 70a and 70b, being shown supported via a single air bearing 72a which rides the flat upper surface of guide ledge 70a and via two longitudinally spaced air bearings 72b, 72c which ride the flat upper surface of guide ledge 70b; in addition, opposed pairs of air bearings 72d, 72e (72f, 72g) at each of two longitudinally spaced locations, ride the opposed vertical surfaces of guide ledge 70b, to assure longitudinal fidelity of carriage 71, throughout its path of displaceability in the X-direction, pursuant to rotation of a drive spindle 89.

A rotary-bearing assembly 71a which performs both radial-bearing and axial-bearing functions is mounted centrally in the carriage 71; these functions are symbolized by vertically spaced antifriction bearing rings, designated 73 and 66. The lower part of the cylindrical base 67 of column 68 is fixed to an annular flange part 78 which carries the graduated annulus 75 for measurement of rotary displacement $\alpha$ about axis A; in addition, flange 78 is engaged by the friction-wheel transmission 77 for rotary displacement of column 68 pursuant to drive by motor 76. Two photoelectric sensors 74a and 74b, at 180° spacing about axis A, are fixedly mounted to rotary-bearing part 71a (and are therefore fixedly mounted to carriage 71) in position to scan the graduated annulus 75 for measurement of rotary displacement about axis A. Linear displacement of carriage 71 is measured by a photoelectric sensor 86, which scans an elongate scale 85 on the guide ledge 70a.

In the embodiment of FIGS. 5 and 6, the center of gravity of column 68 is relatively high, and no large base is available to avoid or prevent inertial tilting displacements; for stabilizing purposes, four compensation weights 65a–d are suspended from the bottom of carriage 71. These weights assure that the center of gravity of all parts driven by spindle 89 are approximately where the drive also acts on carriage 71. In this way, tilting of column 68 is prevented during the course of carriage displacement.

As can be noted from FIG. 6, the machine end which is remote from the workpiece turntable 83 and which is therefore at opposite longitudinal offset from column 68, is provided with vertically oriented magazine structure 91, for accommodation of different probe pins adapted for automated replacement in chucking means of the probe head 82. Magazine 91 is so arranged and oriented that each of the various probe pins can be brought into an available storage location by the measurement arm 81, involving only pure linear displacement in the displacement direction X. This is possible after the measurement arm 81 has been indexed rearward from the measurement-region position shown in FIG. 6, involving such rotation by drive means 76 and about axis A that the measurement arm 81 is parallel to the direction X, and is pointed toward the probe pin to be newly chucked. And it will be understood that each of the coordinate-measuring machines of FIGS. 1 to 4 can be similarly equipped with such a magazine.

In FIGS. 5 and 6, those other parts as have not been described will be understood to correspond functionally to similar parts of the embodiment of FIGS. 1 and 2 and, therefore, have been provided with reference numbers which are incremented by sixty, above corresponding reference numbers of FIGS. 1 and 2.

What is claimed is:

1. A coordinate-measuring machine, comprising:
    a stationary machine part;
    a carriage supported by and guided for a single direction of horizontal displaceability on said stationary part;
    a column extending vertically from said carriage, and rotary-bearing means on said carriage establishing a vertical axis of rotary displaceability of said column;
    a measuring arm supported and guided for vertical displaceability along said column;
    first drive means for displacing said carriage in its horizontally guided direction;
    second drive means for rotary displacement of said column about said axis; and
    measurement systems on said carriage for measuring carriage-misalignment displacement in the direction perpendicular to said single direction of carriage displaceability and/or incremental carriage rotation about the vertical.

2. A coordinate-measuring machine, comprising:
    a stationary machine part;
    a carriage supported by and guided from a single direction of horizontal displaceability on said stationary part, said single direction extending from one to the opposite longitudinal end of said machine, with carriage guidance terminating short of said opposite end;
    a column extending vertically from said carriage, and rotary-bearing means on said carriage establishing a vertical axis of rotary displaceability of said column;
    a measuring arm supported and guided for vertical displaceability along said column;
    first drive means for displacing said carriage in its horizontally guided direction;
    second drive means for rotary displacement of said column about said axis;
    a workpiece-support turntable mounted to said stationary part for rotation about a vertical axis near said opposite end; and
    a vertically oriented probe magazine arranged at said one longitudinal end, said magazine having provision for storage of plural probes in vertically aligned array, whereby for all guided positions of said carriage, the vertical axis of column rotation is longitudinally between the magazine and the turntable.

3. A coordinate-measuring machine, comprising:
    a stationary machine part;
    a carriage supported by and guided for a single direction of horizontal displaceability on said stationary part;
    a column extending vertically from said carriage, and rotary-bearing means on said carriage establishing a vertical axis of rotary displaceability of said column;
    a measuring arm supported and guided for vertical displaceability along said column;
    first drive means for displacing said carriage in its horizontally guided direction;
    second drive means for rotary displacement of said column about said axis;
    a turntable mounted to said stationary part, and third drive means for rotary displacement of said turntable; and
    control means connected for coordinated control of said first, second and third drive means.

4. A coordinate-measuring machine according to claim 3, in which the axis of turntable rotation is parallel to the axis of column rotation, said axes defining a plane which is substantially parallel to said direction of carriage displaceability.

5. A coordinate-measuring machine according to claim 3, in which said column is mounted solely for radial location in said bearing, and in which axial support of said column is provided solely by said stationary machine part.

6. A coordinate-measuring machine according to claim 5, in which said stationary machine part has a flat horizontal surface beneath the horizontal path of carriage displacement of said column, and in which axial support of said column is provided by three air bearings at angular spacings about the rotary axis of said column.

7. A coordinate-measuring machine according to claim 3, in which said column in mounted for both radial and axial location in said carriage.

8. A coordinate-measuring machine according to claim 3, in which said control means includes a computer with memory storage in which systematic deviations of position-measurement values from the actual position are stored as correction parameters.

9. A coordinate-measuring machine, comprising:

a stationary machine part;

a carriage supported by and guided for a single direction of horizontal displaceability on said stationary part;

a column extending vertically from said carriage, and rotary-bearing means on said carriage establishing a vertical axis of rotary displaceability of said column;

a measuring arm supported and guided from vertical displaceability along said column;

first drive means for displacing said carriage in its horizontally guided direction;

second drive means for rotary displacement of said column about said axis;

third drive means for elevational displacement of said measuring arm on said column;

a turntable mounted to said stationary part, and fourth drive means for rotary displacement of said turntable; and control means connected for coordinated control of said first, second, third and fourth drive means.

10. A coordinate-measuring machine according to claim 9, in which said control means produces signals governing rotary displacement of said turntable relative to rotary and linearly guided displacement of a probe mounted to said measurement arm.

11. A coordinate-measuring machine according to claim 9, in which said control means has provision for controlling probe positioning and displacement relative to turntable rotation such that orthogonally related three-axis control inputs (x, y, z) are mathematically transposed into correctly coordinated drives for rotary displacement of the turntable and for rotary and linear components of probe displacement, whereby to effect the inputted three-axis control.

* * * * *